United States Patent
Bonola et al.

(10) Patent No.: US 7,536,567 B2
(45) Date of Patent: May 19, 2009

(54) BIOS-BASED SYSTEMS AND METHODS OF PROCESSOR POWER MANAGEMENT

(75) Inventors: Thomas J. Bonola, Cypress, TX (US);
Scott P. Faasse, Tomball, TX (US);
Kevin G. Depew, Spring, TX (US);
John S. Harsany, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 454 days.

(21) Appl. No.: 11/283,356

(22) Filed: Nov. 18, 2005

(65) Prior Publication Data

US 2006/0129852 A1    Jun. 15, 2006

Related U.S. Application Data

(60) Provisional application No. 60/634,902, filed on Dec. 10, 2004.

(51) Int. Cl.
*G06F 1/00* (2006.01)
*G06F 1/32* (2006.01)
(52) U.S. Cl. .................. 713/300; 713/320; 713/324
(58) Field of Classification Search .......... 713/300, 713/320, 322, 323
See application file for complete search history.

(56) References Cited

U.S. PATENT DOCUMENTS

| | | | |
|---|---|---|---|
| 5,493,683 A | | 2/1996 | Cloud et al. |
| 5,765,004 A | | 6/1998 | Foster et al. |
| 5,913,068 A | * | 6/1999 | Matoba .................. 713/322 |
| 6,105,142 A | | 8/2000 | Goff et al. |
| 6,141,762 A | * | 10/2000 | Nicol et al. ............... 713/300 |
| 6,272,642 B2 | | 8/2001 | Pole, II et al. |
| 6,378,068 B1 | | 4/2002 | Foster et al. |
| 6,425,086 B1 | | 7/2002 | Clark et al. |
| 6,574,739 B1 | * | 6/2003 | Kung et al. ............... 713/322 |
| 6,685,578 B2 | | 2/2004 | Masutani |
| 6,717,434 B2 | | 4/2004 | Takahashi et al. |
| 6,745,335 B1 | * | 6/2004 | Kusano .................... 713/324 |
| 6,766,460 B1 | | 7/2004 | Evoy et al. |
| 6,772,356 B1 | | 8/2004 | Qureshi et al. |
| 6,829,713 B2 | * | 12/2004 | Cooper et al. .............. 713/320 |
| 6,836,849 B2 | | 12/2004 | Brock et al. |
| 7,017,060 B2 | * | 3/2006 | Therien et al. ............. 713/323 |
| 7,093,146 B2 | * | 8/2006 | Riley ....................... 713/310 |
| 7,146,514 B2 | * | 12/2006 | Kaushik et al. ............ 713/322 |
| 7,228,441 B2 | * | 6/2007 | Fung ........................ 713/300 |

(Continued)

OTHER PUBLICATIONS

D. Bodas, "New Server Power-Management Technologies Address Power and Cooling Challenges," Sep. 2003, Technology @Intel Magazine, pp. 1-6.

(Continued)

*Primary Examiner*—Suresh K Suryawanshi (57) ABSTRACT

The present disclosure describes exemplary embodiments of BIOS-based systems and methods of processor power management. Such systems include a computer system, comprising: a processor operable at a plurality of power levels (the processor comprises a register capable of storing a processor load value); a memory coupled to the processor; and BIOS software stored in the memory that executes on the processor, (the BIOS software comprises a power management module). The power management module sets the processor to a new power level of the plurality of power levels if a function of the load value indicates the new power level.

20 Claims, 4 Drawing Sheets

U.S. PATENT DOCUMENTS

| | | | |
|---|---|---|---|
| 7,254,721 B1 * | 8/2007 | Tobias et al. | 713/300 |
| 2002/0004915 A1 | 1/2002 | Fung | |
| 2002/0133241 A1 | 9/2002 | Takahashi et al. | |
| 2004/0025069 A1 | 2/2004 | Gary et al. | |
| 2004/0205362 A1 | 10/2004 | Catherman et al. | |
| 2005/0044429 A1 | 2/2005 | Gaskins et al. | |

OTHER PUBLICATIONS

"Enhanced Intel SpeedStep Technology for the Intel Pentium M Processor," Mar. 2004, White Paper, Intel Corp., pp. 1-12.

"Intel Xeon Processor with 800 MHz System Bus," Jun. 2004, Datasheet, Intel Corp., pp. 75-78.

"IA-32 Intel Architecture Software Developer's Manual," vol. 3: System Programming Guide, Jun. 2005, Intel Corp., pp. 15-29 through 15-77.

"Advanced Configuration and Power Interface Specification," Revision 2.0c, Aug. 25, 2003, Compaq/Intel/Microsoft/Phoenix/Toshiba, Introduction, pp. 1-12.

* cited by examiner

BIOS-BASED SYSTEMS AND METHODS OF PROCESSOR POWER MANAGEMENT

CROSS-REFERENCE TO A RELATED APPLICATION

The present application claims the benefit of, and incorporates by reference, provisional application Ser. No. 60/634,902, filed Dec. 10, 2004, and entitled "Dynamic Processor Power Governor."

BACKGROUND

High-performance computer systems are designed and operated under the assumption that the price paid for such performance is power consumption. The higher the performance, the higher the power consumption. This power penalty has been simply accepted as part of the cost of operating such computer systems. But environmental concerns, the rising cost of operating high-performance computer systems, and constrained power availability at computer installation sites have created a demand for high performance without such a high power premium.

A significant amount of effort by industry and standards groups has resulted in several techniques and standards for managing power within computer systems such as, for example, the Advanced Configuration and Power Interface Specification (ACPI). These techniques have focused on reducing the power consumption of computer systems by powering off or otherwise reducing the power consumption of components of a system that are either not in use or not needed at their maximum performance level at a particular point in time. This approach allows a system to meet peak performance demands when required, but at the same time allows the system to reduce its power consumption when peak performance is not required. Such an approach can lower the overall average power consumption of a system.

But monitoring resource utilization on a high-performance computer system can be a complex task. Because of this complexity, many of the aforementioned power management schemes have been implemented at the operating system level as drivers, or as stand-alone software applications. As a result, many systems that incorporate such power management drivers or applications may suffer a significant reduction in their peak performance levels due to the system overhead associated with executing the power management software. Further, compatibility issues between the operating system and the power management interface provided with the computer system hardware may limit the availability of power management software for a particular system.

BRIEF DESCRIPTION OF THE DRAWINGS

For a detailed description of illustrative embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

The term "software" includes any executable code capable of running on a processor, regardless of the media used to store the software. Thus, code stored in non-volatile memory, and sometimes referred to as "embedded firmware," is included within the definition of software. Further, the term "basic input and output system" (BIOS) is intended to encompass any software, stored in a non-volatile memory device within a computer system, that provides a low-level software interface to the hardware components of the computer system. Although the term BIOS is frequently used in the context of personal computers (PCs), this term is intended to apply in the present disclosure to any computer system, not just PCs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be illustrative of that embodiment, and not intended to intimate that the scope of the disclosure, including the claims, is limited to that embodiment.

Figure 1A:
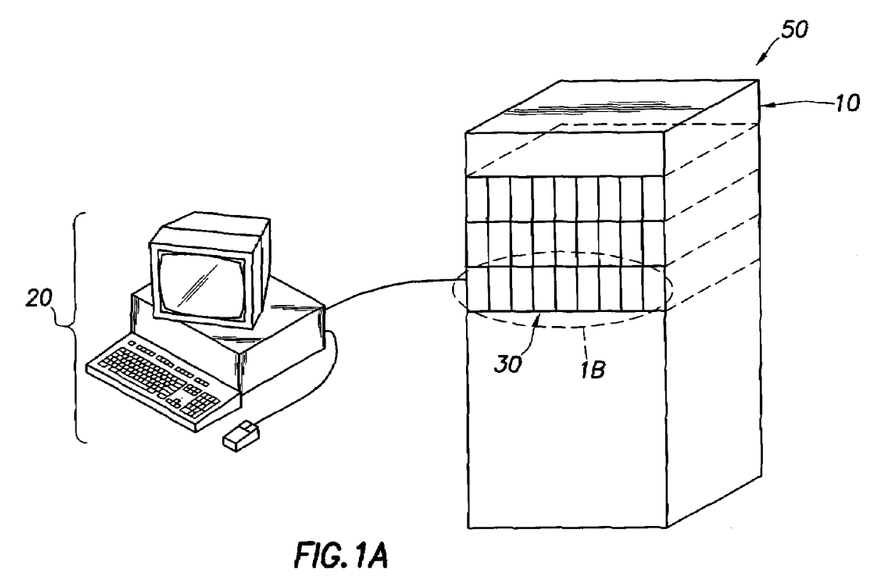
FIG. 1A shows an example of a rack-mounted blade server that incorporates a computer system with dynamic power control, constructed in accordance with at least some illustrative embodiments of the invention.
Figure 1B:
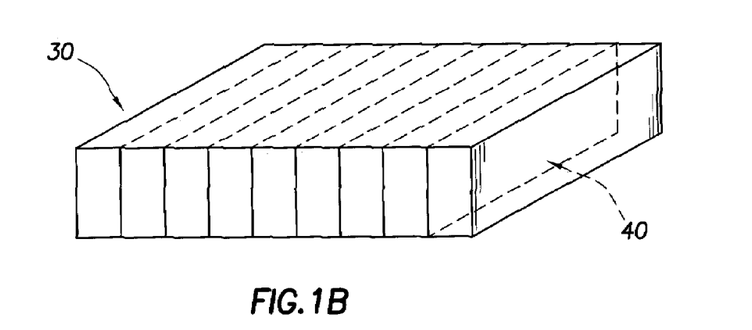
FIG. 1B shows an example of a blade server that incorporates a computer system with dynamic power control, constructed in accordance with at least some illustrative embodiments of the invention.
Figure 1C:
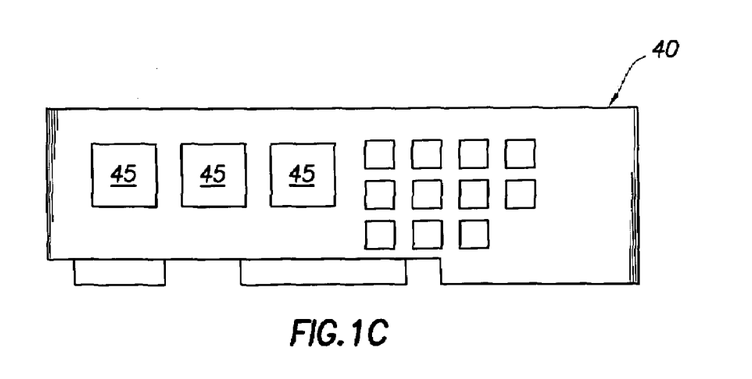
FIG. 1C shows an example of a single-board computer system with dynamic power control usable within a blade server, constructed in accordance with at least some illustrative embodiments of the invention.

FIGS. 1A through 1C show an illustrative blade server 50 incorporating a plurality of computer systems 40 constructed in accordance with at least some illustrative embodiments of the invention. Equipment cabinet 10 contains a plurality of blade server card cages 30, each comprising one or more computer systems 40, and each computer system 40 comprising one or more processors 45. Each computer system 40 plugs into and couples to one of the card cages 30, and each card cage 30 may be interconnected with each other through any one of a number of network interfaces (e.g., Ethernet) or switch fabric interfaces (e.g., Infiniband, or RapidIO). A management workstation 20 couples to one of the plurality of computer systems 40 that acts as a management node for the blade server. The remaining computer systems 40 act as compute nodes that can be operated either as individual servers, or in groups as one or more virtual servers. Each of the processors 45 within each computer system 40 can dynamically manage its own power level individually, in concert with other processors 45 within an individual computer system 40, or in concert with other processors 45 within other computer systems 40 of the blade server 50, as described below.

Figure 2:
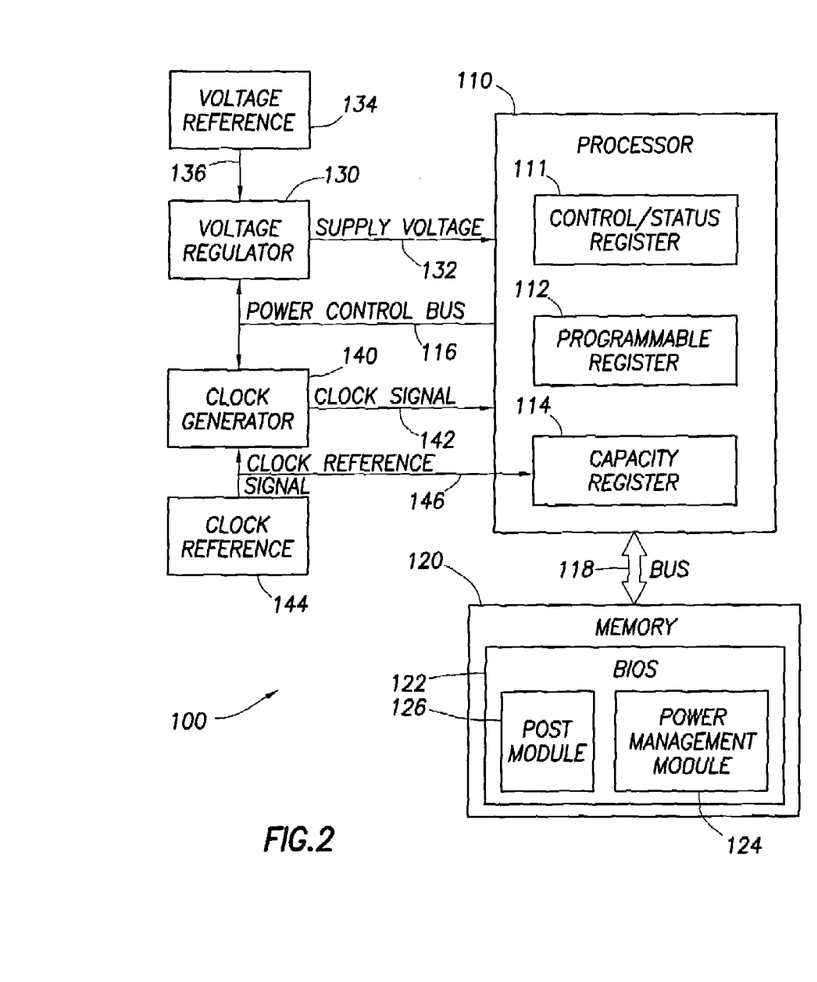
FIG. 2 shows a single-processor implementation of a computer system with dynamic power control, constructed in accordance with at least some illustrative embodiments of the invention.

FIG. 2 illustrates a single-processor computer system 100, constructed in accordance with at least some illustrative embodiments of the invention. The computer system 100 is similar to the computer system 40 of FIGS. 1B and 1C, and comprises a processor 110 that is capable of operating at multiple power levels. The processor 110 comprises programmable register 112 and capacity register 114, which may be configured to monitor utilization levels and utilization rates of processor 110. These registers may monitor and measure utilization levels by counting clock pulses. Thus, for example, programmable register 112 may be configured to count clock pulses during user instruction cycles to determine the amount of time the processor is used to process user instructions, while the capacity register 114 may be configured to continuously count clock pulses to provide a reference count against which the user instruction count may be compared to determine a utilization ratio or percentage.

The processor 110 also comprises control/status register 111, which is used to set and read the power level of the processor 110. In the illustrative embodiment of FIG. 2, the power level or power consumption rate is set by varying the magnitude of the supply voltage 132 applied to at least part of the processor 110 (e.g., the processor core), by varying the frequency of the clock signal 142 used by the processor 110, or by varying both the supply voltage 132 and the frequency of clock signal 142. Voltage reference 134 couples to regulator 130, which generates supply voltage 132 by regulating down voltage reference signal 136 to a desired level for supply voltage 132. Likewise, clock reference 144 couples to clock generator 140, which generates clock signal 142 by dividing down clock reference signal 146 to a desired frequency for clock signal 142. Clock reference 144 also couples to capacity register 114, allowing the capacity register 114 to operate at the maximum clock frequency regardless of the frequency of clock signal 142.

By operating at the maximum clock frequency, capacity register 114 provides a reference value that measures the maximum instruction execution capacity of the processor. This capacity may be measured in a number of different ways, such as, for example, by counting clock cycles or by counting instruction cycles. In other illustrative embodiments, the maximum instruction execution capacity of the processor may be a static value stored in a lookup table in non-volatile memory that is read upon system startup, or may be a value measured upon system startup with the system operating at the maximum clock frequency. This value could then be used as a reference value for all future utilization calculations without the need for a dedicated capacity register. Other techniques for determining the maximum instruction execution capacity of the processor 110 may become apparent to those skilled in the art, and the present disclosure is intended to encompass all such techniques.

Continuing to refer to FIG. 2, power control bus 116 couples processor 110 to voltage regulator 130, and provides digital values to voltage regulator 130 corresponding to values written to control/status register 111. Digital values presented on power control bus 116 cause the voltage regulator 130 to set supply voltage 132 to predetermined levels corresponding to the each digital value. Voltage regulator 130 couples back to processor 110, and provides supply voltage 132 to at least part of processor 110. Control bus 116 also couples processor 110 to clock generator 140. The digital values provided by processor 110 thus may also control the frequency of clock signal 142 provided by clock generator 140, which couples back to processor 110. Although the embodiment of FIG. 2 shows both voltage regulator 130 and clock generator 140 external to processor 110, either or both may be incorporated within the processor 110. Further, although the illustrative embodiments described use digital signals to control both the voltage regulator 130 and the clock generator 140, analog signals may also be used for this purpose. The present disclosure is intended to encompass all such embodiments and variations.

Processor 110 couples to memory 120 via bus 118. Bus 118 comprises address and data signals needed to access information stored within memory 120. Memory 120 may comprise any number of types of memories (e.g., random access memory (RAM), read-only memory (ROM), electrically erasable programmable read-only memory (EEPROM), and Flash ROM), and the present disclosure is not intended to be limited to any particular type of memory technology. In the illustrative embodiment shown, memory 120 includes a non-volatile memory, such as a Flash ROM, which stores the basic input and output system (BIOS) code 122. BIOS code 122 in turn includes a power management module 124 and power-on self-test (POST) module 126. Although the BIOS code is stored in non-volatile memory and may be executed directly by the processor from said non-volatile memory, memory 120 may also comprise volatile memory, such as RAM, into which part or all of the BIOS code may copied prior to execution. This may take place through several different mechanisms (e.g., shadowing or caching), and the present disclosure is not intended to be limited to any particular mechanism.

The power management module 124 within BIOS code 122 executes on processor 110 and sets the power level at which the processor 110 operates, based on the level of utilization of the processor 110. The POST module 126 of the BIOS code 122 runs tests on the computer system 100 upon initial power-up to make sure that the major components of the system function correctly. The POST module 126 also performs low-level configuration of the system hardware in response to configuration values (not shown) saved within memory 120. As part of this low-level configuration, the POST module 126 checks to make sure that processor 110 supports dynamically changing its power configuration. If dynamic power reconfiguration is supported, the POST module configures the processor 110 to execute the power management module 124. This configuration comprises setting up the power management module 124 to execute periodically, and setting up programmable register 112 and capacity register 114 to monitor the level of utilization of the processor 110.

In the illustrative embodiment of FIG. 2, periodic execution of the power management module 124 is accomplished by using a high-priority interrupt mechanism built into the processor 110. In x86 compatible computer systems, including but not limited to Intel processors such as the Xeon class of processors and AMD processors such as the Opteron class of processors, for example, the system management interrupt (SMI) may be used for this purpose. The system management mode (SMM) interrupt service routine (ISR) operates at a high priority, at a high privilege level, and in a manner not visible to the operating system (once the operating system is booted and running). The power management module 124 is configured by the POST module 126 to operate as an ISR, wherein a timer-based interrupt triggers execution of the power management module 124 at fixed, periodic intervals.

As already mentioned, POST module 126 also sets up programmable register 112 and capacity register 114 to monitor one or more levels of utilization of the processor 110. These registers within the processor may be set up, for example, to count the number of actual instructions retired by the processor 110 as a percentage of the maximum number of instructions that could be retired within a given fixed time interval. Such capabilities for monitoring and counting retired instructions may be built into the processor, (e.g., the performance monitoring capabilities built into the Intel Pentium and Xeon processors), or may be achieved using hardware external to a processor to monitor the instruction bus of the processor and count specific types of instructions. Many other possible configurations for monitoring and counting processor instructions may become apparent to those skilled in the art, and all are intended to be within the scope of the present disclosure.

The power management module 124 periodically reads programmable register 112 and capacity register 114 to determine if the utilization levels of the processor require a change in the power level of the processor. The utilization levels read from programmable register 112 and capacity register 114 may be manipulated as instantaneous values, or treated as rates based on the known execution interval of the power management module 124. Once the POST module 126 has completed setting up the computer system 100 for operation, the power management module 124 will be executed periodically. Each time the power management module 124 executes, it checks programmable register 112 and capacity register 114 to determine the utilization level of the processor 110. If the processor 110 is not being used heavily, power management module 124 sets the processor 110 to operate at a lower frequency and a lower voltage, which slows down the processor 110 and causes it to consume less power. If the processor 110 is being used heavily, power management module 124 sets the processor 110 to operate at a higher frequency and a higher voltage, speeding up the processor 110 and causing it to consume more power.

In the illustrative embodiment of FIG. 2, values are loaded into the control/status register 111 that represent voltage/frequency pairs at which the processor 110 is operated. Although the processor 110 may be operated throughout a range of voltages and clock frequencies (e.g., 0.956-1.484 volts and 0.6-1.6 GHz for an Intel Pentium M processor), the processor 110 of the illustrative embodiment is limited to operating only at certain discrete combinations of voltages and frequencies. The use of only selected pairs of values keeps the processor operating properly and avoids exceeding the electrical and thermal limits of the processor 110. Thus, for example, at 1.6 GHz the core of an Intel Pentium M class processor can be operated at 1.484 volts, and at 600 MHz the core can be operated at 0.956 volts. But at 1.6 GHz the core may fail to operate properly if it is operated at 0.956 volts, and at 600 MHz the core may exceed either its electrical or thermal tolerances, or both, if it is operated at 1.484 volts. In addition, limiting the supported frequency and voltage combinations for the processor greatly reduces validation time.

Although the difference in execution speed between operating the processor 110 at a low-performance/low-power setting and a high-performance/high-power setting is significant, for many applications that are not processing intensive (e.g., programs that are input/output intensive), operating the processor 110 at a lower clock frequency results in only a small increase in the overall execution time of the application. The reduction in power that results from the reduction in clock frequency and voltage, however, may be quite significant given that the power consumption of the processor 110 is proportional to both the frequency of clock signal 142 and the square of the supply voltage 132. Thus, a significant power savings may be achieved by the illustrative embodiment of the computer system 100 of FIG. 2, with only a small performance penalty for at least some applications executing on a lightly loaded processor 110.

Figure 3:
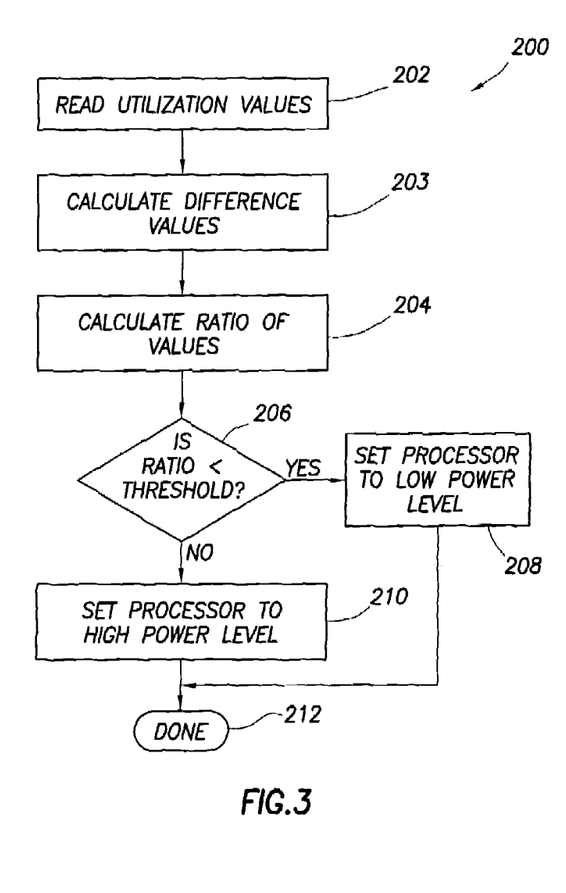
FIG. 3 shows a method for dynamically controlling the power level of a processor within a computer system, in accordance with at least some illustrative embodiments of the invention.

As previously noted, the power management module 124 of the illustrative embodiment of FIG. 2 periodically reads and processes utilization values maintained in programmable register 112 and capacity register 114 to determine the level of utilization of the processor 110, and to adjust the power level of the processor 110 accordingly as needed. FIG. 3 illustrates a method 200 for providing at least some of the power management functions described and performed by power management module 124, in accordance with at least some illustrative embodiments of the invention. Utilization values that represent selected utilization metrics monitored by the processor 110 of FIG. 2 are read as shown in block 202. The utilization values are selected to provide a simple but representative measure of the overall usage levels of the processor. The utilization values may be, for example, the number of user-level instructions retired (i.e., completed instructions executed at a low privilege level) and the maximum number of all instructions that could be retired at the maximum clock rate.

Once the utilization values are read, difference values are calculated (block 203), representing the difference between the current values and the values read in the previous ISR cycle. The difference values represent the level of utilization for each execution cycle of the power management module 124. A ratio is then calculated by dividing the number of user-level instructions retired during the latest ISR interval by the maximum number of instructions that could have been retired at the maximum clock rate during the latest ISR interval (block 204). This calculation is represented by formula (1):

$$R(\text{RetInst}_{User}(t) - \text{RetInst}_{User}(t-1))/(\text{RetInst}_{Max}(t) - \text{RetInst}_{Max}(t-1)) \qquad (1)$$

where
$\text{RetInst}_{User}(t)$=the number of user-level instructions retired since the last system reset up to time t
$\text{RetInst}_{Max}(t)$=the maximum number of instructions that could have been retired at the maximum clock rate since the last system reset up to time t The ratio R provides a measure of the use of the processor by non-operating system application programs (the processor "load") as a percentage of the maximum possible use of the processor (the processor "capacity"), measured between two successive execution cycles of the power management module 124. Additional calculations may be performed to account for the rollover of the registers 112 and 114. Further, the registers 112 and 114 may be configured to reset when read, and the values read may then be used directly to calculate the ratio R, replacing each of the difference calculations. Other methods for measuring and calculating utilization values over a time interval will be apparent to those skilled in the art, and the present disclosure is intended to encompass all such variations.

The ratio R calculated in block 204 is compared against a predetermined threshold value (block 206) to determine what power level is applicable, given the level of use of the processor 110 over the last measurement interval. If the level of utilization is below the threshold, the processor is set to a low power level (block 208). Otherwise the processor is set to a high power level (block 210). Once the processor 110's power level has been set, the current iteration of the power management cycle for the processor 110 is complete (block 212). Although the illustrative embodiment described uses only two power levels based on a single threshold value, additional power levels and thresholds may also be used. For example, two threshold values may be used such that a processor can support high power, medium power, and low power states. Also, hysterisis may be incorporated into method 200 by the use of two separate threshold levels, which can help to reduce the occurrence of oscillations between two power levels when the utilization ratio R is varying just above and below one of the threshold values. Other variations will be apparent to those skilled in the art, and all such variations are intended to be within the scope of the present disclosure.

Figure 4:
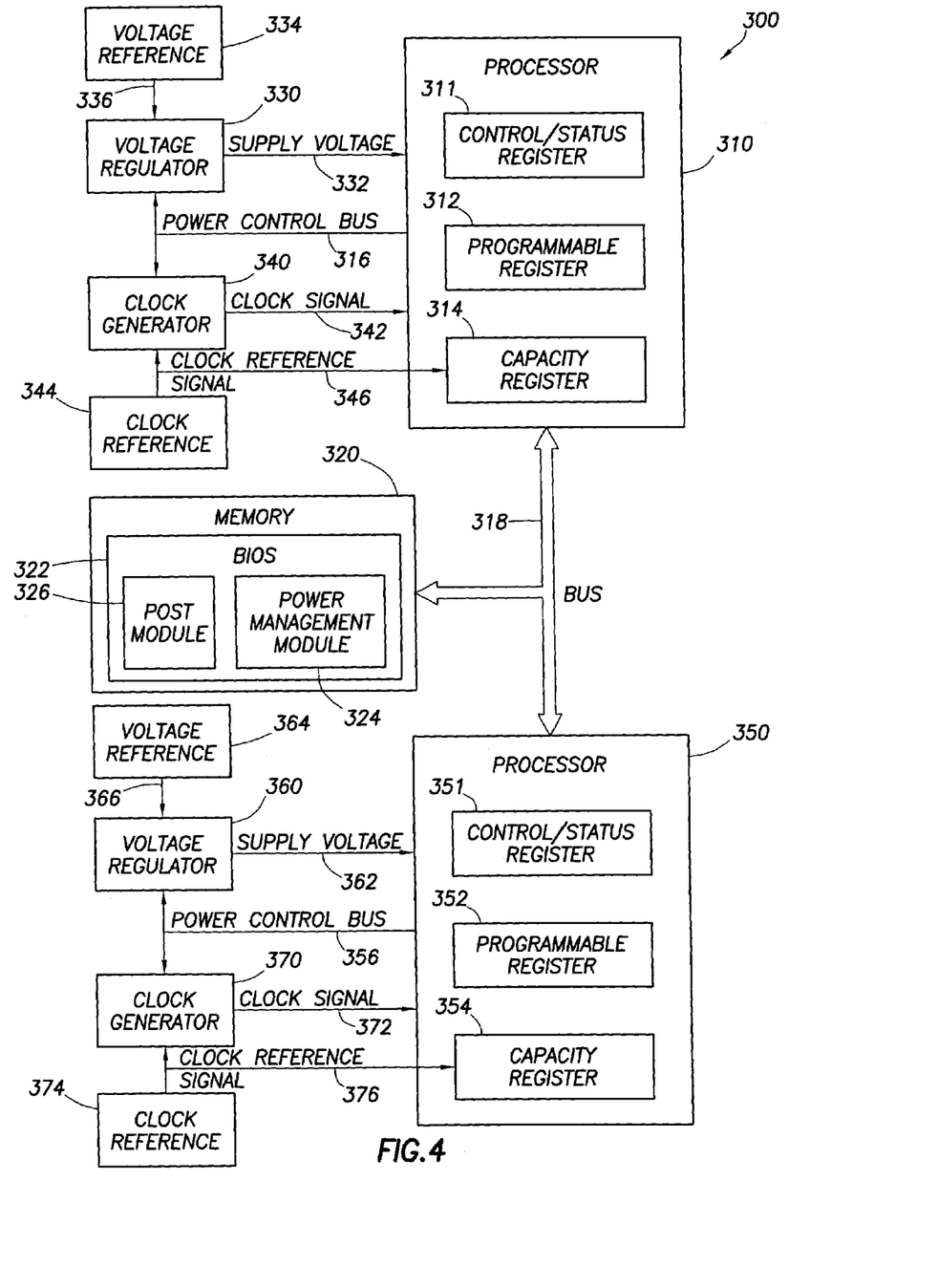
FIG. 4 shows a multi-processor implementation of a computer system with dynamic power control, constructed in accordance with at least some illustrative embodiments of the invention.

At least some illustrative embodiments of the invention comprise multi-processor computer systems, such as the illustrative embodiment shown in FIG. 4. Each processor 310 and 350 is capable of operating at multiple power levels or power consumption rates, and each comprises a control/status register (311 and 351 respectively) for controlling the power level of each processor 310 and 350, as well as programmable registers 312 and 352 and capacity registers 314 and 354 for monitoring the utilization levels and rates of the processors 310 and 350. The power level of each processor 310 and 350 may be set by varying either the magnitude of the supply voltages 332 and 362 provided respectively to at least part of each of the processors 310 and 350, by varying the frequency of the clock signals 342 and 372 provided to each of the processors 310 and 350, or by varying both the magnitudes of the supply voltages 332 and 362 and the frequency of the clock signals 342 and 372. Voltage references 334 and 364 couple respectively to regulators 330 and 360, which generate supply voltages 332 and 362 by regulating down voltage reference signals 336 and 366, respectively, to a desired level for supply voltages 332 and 362. Likewise, clock references 344 and 374 couple respectively to clock generators 340 and 370, which generate clock signals 342 and 372 by dividing down clock reference signals 346 and 376, respectively, to a desired frequency for clock signals 342 and 372. Clock references 344 and 374 each also respectively couple to capacity registers 314 and 354, allowing the capacity registers 314 and 354 to each operate at the maximum clock frequency regardless of the frequency of clock signals 342 and 372.

Individual power control busses 316 and 356 couple each corresponding processor 310 and 350 to voltage regulators 330 and 360, and to clock generator 340 and 370. Digital values presented on each power control bus 316 and 356 causes each voltage regulator 330 and 360 to set the magnitude of the respective supply voltages 332 and 362 provided by each voltage regulator 330 and 360. The voltage regulators 330 and 360 couple back to a respective processor 310 and 350. Likewise, the digital values presented on each power control bus 316 and 356 also determine the frequency of each clock signal 342 and 372 output respectively by clock generators 340 and 370 to each processor 310 and 350. The clock generators 340 and 370 also each couple back to a corresponding processor 310 and 350. Although the illustrative embodiments described use digital signals to control voltage regulators 330 and 360, as well as clock generators 340 and 370, analog signals may also be used for this purpose, and all such variations and embodiments are intended to be within the scope of this disclosure.

Processors 310 and 350 couple to each other and to memory 320 via bus 318. Bus 318 comprises address and data signals needed to access information stored within memory 320. Memory 320 comprises BIOS code 324, used by both processors 310 and 350. BIOS code 324 comprises power management module 324 and POST module 326. POST module 326 is used by both processors 310 and 350 to perform initial power-up testing of the processors 310 and 350, and to set up periodic execution of instances of the power management module 324 on each processor. Each instance may be executed on the processors 310 and 350 using a number of different mechanisms such as, for example, forked execution or multi-threading. Although the present disclosure discusses an illustrative embodiment that implements a multi-threaded approach, it is only one of a variety of possible embodiments, all of which are intended to be within the scope of the present disclosure.

Figure 5:
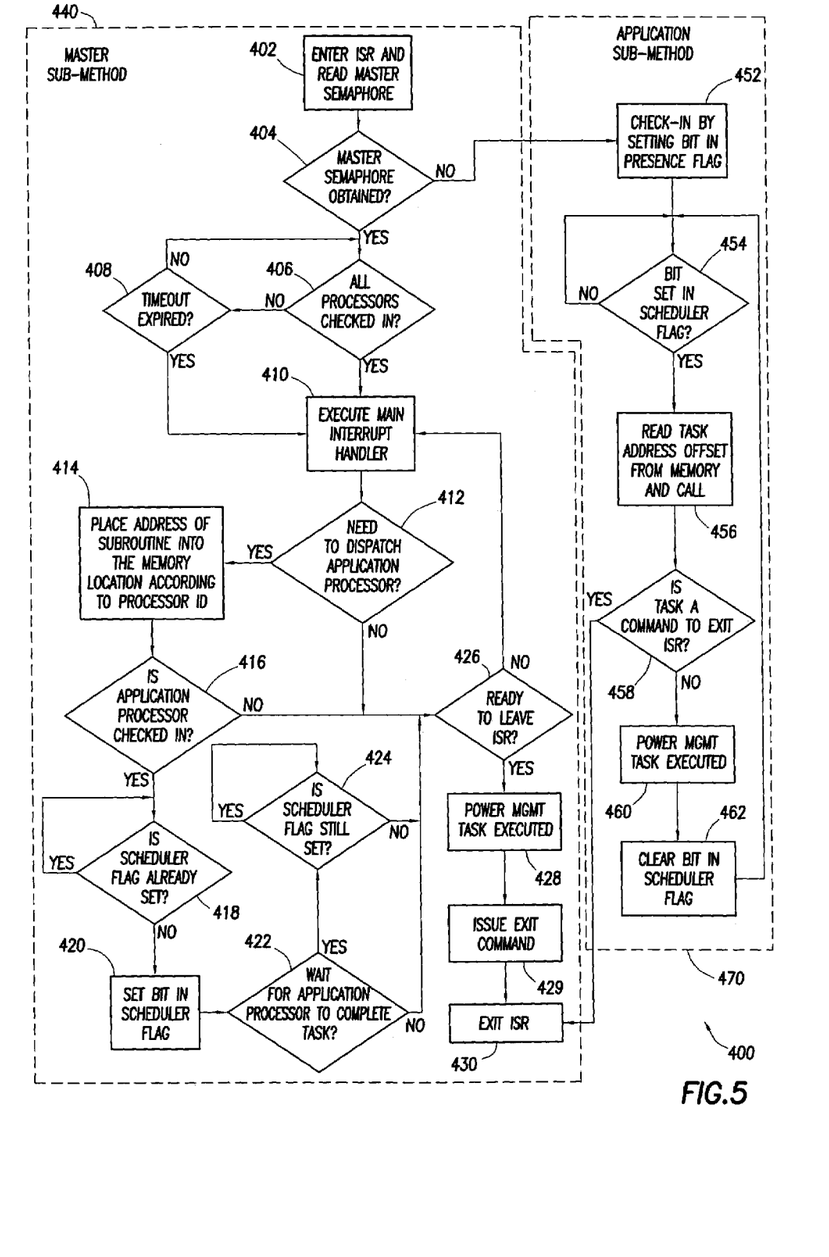
FIG. 5 shows a method for managing dynamic power control of a multi-processor computer system, in accordance with at least some illustrative embodiments of the invention.

FIG. 5 illustrates method 400, which comprises a multi-threaded version of the power management module 324 of FIG. 4 that executes on the multi-processor system 300 of FIG. 4. Method 400 is implemented as a periodically executed ISR. When the ISR begins execution on a processor within a multi-processor system, such as one of the processors 310 or 350 of FIG. 4, an attempt is made to read and lock a master semaphore (block 402). If the semaphore is not already locked and is successfully obtained by the master processor (block 404), the processor currently executing the ISR becomes the master processor and continues to execute master sub-method 440. Additional threads within the ISR that are subsequently launched on the remaining non-master processors (in response to the same interrupt) will each fail to obtain the master semaphore (blocks 402 and 404). As a result, each of these threads will execute application sub-method 470 on each of the remaining processors, now defined as application processors.

After obtaining the master semaphore, the master processor must wait for all the application processors to check in by monitoring a status word in memory containing bits corresponding to each application processor in the system (block 406). After all application processors have checked in (block 406) or timed out (block 408), the master processor begins execution of the main interrupt handler (block 410). Once other, non-power management tasks have been completed by the main interrupt handler, the ISR checks to see if there are any power management events, such as an expired periodic timer, that require application processors to be dispatched to perform power management functions for the current interrupt cycle (block 412). The ISR may need to dispatch application processors several times during the course of one interrupt cycle. Therefore, the check for the need to dispatch an application processor to perform a power management function (block 412) may occur several times throughout one interrupt cycle. If there is no need to dispatch an application processor, the master processor proceeds to check for the end of ISR processing (block 426). Otherwise, the address for a power management module, corresponding to an application processor needing to be dispatched, is loaded into a memory location reserved for that particular application processor (block 414). The location may be determined at least in part by a unique identifier associated with the application processor (e.g., the advanced programmable interface controller (APIC) ID used by x86 compatible processors by Intel and AMD).

After setting up the call address of the power management module for a particular application processor, the ISR checks once again to see if the particular application processor has checked in (block 416) to account for the case where the application processor had previously timed out. If the application processor still has not checked in, the master processor proceeds to check for the end of ISR processing (block 426). If the application processor has checked in, the master processor uses a scheduler flag to trigger execution of the application sub-method 470 on the targeted application processor, and to optionally monitor completion of the application sub-method 470 (blocks 418-424).

Once the application processor has been dispatched (and, optionally, once application sub-method 470 has been completed on the selected application processor), the master processor proceeds to check for the end of interrupt processing (block 426). If the master processor has not yet completed interrupt processing, the main interrupt handler is again executed and the entire process from block 410 through block 426 is repeated. If interrupt processing has completed (block 426), the master processor performs the same power management functions performed by the application processors (block 428). These functions may include method 200 of FIG. 3, as described above. Once the master processor completes execution of its own power management functions, an exit command is issued to the application processors (block 429), and the ISR exits (block 430).

As noted, each of the application processors executes the application sub-method 470 of method 400. The application processor first checks in with the master processor via a presence flag (block 452) and then waits for a bit in the scheduler flag to be set by the master processor. When the bit in the scheduler flag corresponding to the application processor indicates that the application processor may proceed (block 454) the application processor reads the block of memory reserved for that particular application processor (block 456) and obtains both the command issued from the master processor, and a start address for the power management module corresponding to the application processor (if applicable to the command issued). If the command issued by the master is an exit command (block 458), the ISR executing on the application processor exits (block 430). Otherwise, the power management functions for the application processor are executed (block 460), and once completed, the bit in the scheduler flag corresponding to the particular application processor is cleared (block 462), indicating to the master processor that the application processor has completed its power management cycle. The application processor will continue to execute the ISR until an exit command is received. As with the master processor, the power management functions may include the method 200 of FIG. 3, as described above.

In the embodiment of FIG. 5 each processor: modifies its own power level independent of the other processors within the system. In other alternative embodiments (not shown) each processor reports its current utilization to the master processor, and the master decides when to switch power levels. The master processor then issues a command to the application processors, and the processors all switch to the same new power level. Further, multiple computer systems, such as computer systems 100 (FIG. 2) and 300 (FIG. 4) may operate in concert (e.g., compute nodes within a blade server) when switching processor power levels. Other system configurations and methods for coordinated switching of the power level of individual processors are possible, and all such methods are intended to be within the scope of this disclosure.

The above discussion is meant to be illustrative of the principles and various embodiments of the present invention. Numerous variations and modifications will become apparent to those skilled in the art once the above disclosure is fully appreciated. For example, although the embodiments describe Intel processors in some of the examples given, any other brand or type of processor that is capable of operating at multiple power levels and that is capable of dynamically changing power levels may also be used. Further, although power control is achieved in the illustrative embodiments by varying the supply voltage and the clock frequency by discrete increments, control of the power consumption of a processor may be achieved by continuous variation of the supply voltage and the clock frequency, and by a variety of other means that do not necessarily include varying the supply voltage or the clock frequency.

Additionally, other metrics may be used to measure the utilization of the processor. Idle time, memory cache hits, and completed floating point operations all may be used as a basis for determining the processor utilization and the corresponding power consumption level or rate of the processor. These metrics may be measured using the clock pulse counting technique already described, as well as by monitoring control and status signals coupled to one or more of the processors and periodically logging or counting transitions of these signals. Further, as already noted, some processors may already have the built-in capability to monitor and log specific types of activities, and the present disclosure is intended to encompass the use of the built-in capabilities of such processors. Also, the power consumption of the processor may be periodically measured directly, rather than indirectly based on the number of executed instructions. This may be accomplished by analog monitoring circuitry coupled to digital-to-analog converters that allow the processor to monitor its own voltage and current consumption levels, thus allowing the processor to compute its own actual power consumption. It is intended that the following claims be interpreted to embrace all such variations and modifications.

What is claimed is

1. A computer system, comprising:
    a processor operable at a plurality of power levels, the processor comprises a register capable of storing a processor load value;
    a memory coupled to the processor;
    a second processor coupled to the processor and to the memory; and
    BIOS software stored in the memory that executes on the processor, wherein the BIOS software comprises a power management module;
    wherein the power management module sets the processor to operate at a new power level of the plurality of power levels if a function of the processor load value indicates the new power level;
    wherein the power management module executes concurrently on the second processor and sets a second power level of the second processor independently of the processor;
    the processor further comprising a second register capable of storing a processor capacity value; and
    wherein the function computes a utilization ratio equal to the processor load value divided by the processor capacity value, and further compares the utilization ratio to a first threshold value.

2. The computer system of claim 1, wherein the processor is set to the new power level by setting a supply voltage provided to at least part of the processor.

3. The computer system of claim 1, wherein the processor is set to the new power level by setting a frequency of a clock signal provided to the processor.

4. The computer system of claim 1, wherein the power management module periodically executes on the processor based on a regularly scheduled processor interrupt.

5. The computer system of claim 4, wherein the regularly scheduled processor interrupt is a system management interrupt (SMI).

6. The computer system of claim 1,
wherein the function further indicates that a low power level is the new power level, if the utilization ratio is below the first threshold value.

7. The computer system of claim 1,
wherein the function further compares the utilization ratio to a second threshold value; and
wherein the function further indicates that a high power level is the new power level, if the utilization ratio is not below the second threshold value.

8. The computer system of claim 1, wherein the processor load value comprises a number of user-level instructions retired by the processor.

9. The computer system of claim 1, wherein the processor capacity value comprises a maximum number of instructions that can be retired by the processor.

10. The computer system of claim 1, further comprising:
a second processor operable at a second plurality of power levels, the second processor comprises a third register capable of storing a second processor load value, the second processor couples to the first processor and to the memory;
wherein the power management module further executes concurrently on the second processor; and
wherein the power management module that executes on the second processor sets the second processor to operate at a second new power level of the second plurality of power levels if a function of the second processor load value indicates the second new power level.

11. The computer system of claim 10,
wherein the power management module executes on each of said processors as separate execution threads; and
wherein the separate execution threads communicate with each other and synchronize performance of tasks within each separate thread.

12. A power management method, comprising:
monitoring a processing load of a processor;
executing periodically a BIOS power management routine on the processor that chooses a power level based on the processing load of the processor;
setting the processor to a chosen power level;
executing periodically the BIOS power management routine concurrently on a second processor;
setting the second processor to a second power level independently of the processors;
monitoring a processing capacity of the processor;
dividing the processing load of the processor by the processing capacity of the processor to determine a percentage of use of the processor;
choosing a low power level if the percentage of use of the processor is less than a first reference value; and
choosing a high power level, higher than the low power level, if the percentage of use of the processor is greater or equal than a second reference value.

13. The method of claim 12,
wherein the processing load of the processor comprises the amount of time the processor is used by user application software programs executing on the processor within a fixed time period; and
wherein the processing capacity of the processor comprises the amount of time the processor is available for use by all software programs executing on the processor within the fixed time period.

14. The method of claim 12, further comprising:
monitoring a processing load of a second processor;
executing periodically the BIOS power management routine on the second processor that chooses a second power level based on the processing load of the second processor; and
setting the second processor to a second chosen power level.

15. The method of claim 14, further comprising:
monitoring a processing capacity of the second processor;
dividing the processing load of the second processor by the processing capacity of the second processor to determine a percentage of use of the second processor;
choosing a low second power level if the percentage of use of the second processor is less than a first reference value; and
choosing a high second power level, higher than the low second power level, if the percentage of use of the second processor is greater or equal than a second reference value.

16. The method of claim 15,
wherein the processing load of the second processor comprises the amount of time the second processor is used by user application software programs executing on the second processor within the fixed time period; and
wherein the processing capacity of the second processor comprises the amount of time the second processor is used by all the software programs executing on the second processor within the fixed time period.

17. The method of claim 14, wherein periodically executing the power management routine on each of said processors comprises executing the power management routine as individual execution threads on each processor.

18. The method of claim 17, further comprising coordinating the execution sequence of each individual execution thread by exchanging information between the individual execution threads.

19. The method of claim 17, further comprising defining a master thread that controls the execution of each of the individual execution threads.

20. A computer system, comprising:
a first processor operable at a first plurality of power consumption rates, the first processor comprises a first means for monitoring a first usage rate of the first processor;
a second processor operable at a second plurality of power consumption rates, the second processor comprises a second means for monitoring a second usage rate of the second processor;
a means for controlling both a first power consumption rate of the first processor, and a second power consumption rate of the second processor; and a memory coupled to both the first processor and the second processor, the memory comprises the means for controlling;

wherein the means for controlling sets the first power consumption rate of the first processor based upon a function of the first usage rate;

wherein the means for controlling further sets the second power consumption rate of the second processor based upon a second function of the second usage rate;

the first processor further comprising a second means for monitoring a processor capacity value; and wherein the function computes a utilization ratio equal to the first usage rate divided by the processor capacity value, and further compares the utilization ratio to a first threshold value.

* * * * *

UNITED STATES PATENT AND TRADEMARK OFFICE
CERTIFICATE OF CORRECTION

PATENT NO. : 7,536,567 B2
APPLICATION NO. : 11/283356
DATED : May 19, 2009
INVENTOR(S) : Thomas J. Bonola et al.

It is certified that error appears in the above-identified patent and that said Letters Patent is hereby corrected as shown below:

In column 6, line 45, delete "$R(RetInst_{User}(t)$" and insert -- $R = (RetInst_{User}(t)$ --, therefor.

In column 11, line 57, in Claim 12, delete "processors;" and insert -- processor; --, therefor.

Signed and Sealed this

Twenty-second Day of December, 2009

David J. Kappos
*Director of the United States Patent and Trademark Office*